US009068102B2

(12) United States Patent
Nagato et al.

(10) Patent No.: US 9,068,102 B2
(45) Date of Patent: Jun. 30, 2015

(54) LAMINATED ARTICLE HAVING EXCELLENT STAIN-PROOFING PROPERTY AND INTERLAYER ADHESION AND METHOD OF PRODUCTION OF SAME

(75) Inventors: Masaru Nagato, Settsu (JP); Masahiko Maeda, Settsu (JP); Teruhito Maruyama, Isehara (JP)

(73) Assignees: DOW CORNING TORAY CO., LTD., Tokyo (JP); DAIKIN INDUSTRIES, LTD., Osaka (JP)

( * ) Notice: Subject to any disclaimer, the term of this patent is extended or adjusted under 35 U.S.C. 154(b) by 1608 days.

(21) Appl. No.: 11/664,680

(22) PCT Filed: Oct. 4, 2005

(86) PCT No.: PCT/JP2005/018717
§ 371 (c)(1),
(2), (4) Date: Apr. 5, 2007

(87) PCT Pub. No.: WO2006/038702
PCT Pub. Date: Apr. 13, 2006

(65) Prior Publication Data
US 2008/0085416 A1 Apr. 10, 2008

(30) Foreign Application Priority Data
Oct. 6, 2004 (JP) ................................. 2004-293947

(51) Int. Cl.
C09D 183/04 (2006.01)
B32B 27/00 (2006.01)
C08L 83/04 (2006.01)
B32B 27/26 (2006.01)
B32B 27/08 (2006.01)

(52) U.S. Cl.
CPC ............... *C09D 183/04* (2013.01); *B32B 27/00* (2013.01); *C08L 83/04* (2013.01); *B32B 27/26* (2013.01); *B32B 27/08* (2013.01)

(58) Field of Classification Search
USPC .............................. 428/429, 216, 72; 200/333
See application file for complete search history.

(56) References Cited

U.S. PATENT DOCUMENTS

| 4,122,127 | A | * | 10/1978 | Mikami et al. ............... 525/477 |
| 4,287,114 | A | * | 9/1981 | Itoh et al. .................... 524/493 |
| 4,311,737 | A | * | 1/1982 | Ishizaka et al. ............... 427/386 |
| 4,332,844 | A | * | 6/1982 | Hamada et al. ............... 427/387 |
| 4,981,759 | A | * | 1/1991 | Nakatani et al. .............. 428/626 |
| 5,008,349 | A | * | 4/1991 | Kosal et al. .................. 525/477 |
| 5,175,057 | A | * | 12/1992 | Wengrovius et al. ......... 428/447 |
| 5,213,617 | A | * | 5/1993 | Blizzard .................. 106/287.13 |
| 5,246,995 | A | * | 9/1993 | Murakami et al. ............ 524/265 |
| 6,485,838 | B1 | * | 11/2002 | Shimada et al. .............. 428/429 |
| 2001/0006992 | A1 | | 7/2001 | Yoshida et al. |
| 2002/0107318 | A1 | * | 8/2002 | Yamada et al. ............... 524/495 |
| 2002/0136903 | A1 | | 9/2002 | Finsterwalder et al. |
| 2002/0182392 | A1 | * | 12/2002 | Welch et al. .................. 428/216 |
| 2004/0266923 | A1 | * | 12/2004 | Fehn et al. .................... 524/261 |
| 2006/0054053 | A1 | * | 3/2006 | Masutani et al. ................. 106/2 |

FOREIGN PATENT DOCUMENTS

| CN | 1299379 A | | 6/2001 | |
| CN | 1306058 A | | 8/2001 | |
| EP | 1 046 667 A2 | | 10/2000 | |
| EP | 1 065 573 A1 | | 1/2001 | |
| EP | 1090936 A1 | | 4/2001 | |
| EP | 1 595 926 A1 | | 11/2005 | |
| GB | 2 285 340 A | | 7/1995 | |
| JP | H02-214624 | * | 8/1990 | ................. C08J 7/04 |
| JP | 4-173328 A | | 6/1992 | |
| JP | H05-295267 | * | 11/1993 | ............. C08L 83/07 |
| JP | 7-220553 A | | 8/1995 | |
| JP | 2000-301054 A | | 10/2000 | |
| JP | 2004-138764 A | | 5/2004 | |
| WO | WO 02/02320 | * | 1/2002 | ............. B32B 27/06 |
| WO | WO0202320 | * | 1/2002 | ............. B33B 27/06 |
| WO | 2004/067658 A1 | | 8/2004 | |

OTHER PUBLICATIONS

Vandenberg et al Journal of Colloid and Interface Science vol. 147 No. 1 Nov. 1991 pp. 103-118.*
Vyazovkin et al. Macromolecules 1996 vol. 29 pp. 1867-1873.*
Jones et al. (Silicon Containing Polymers, ed. Jones et al. (C) 2000 Kluwer Academic Publishers Netherlands).*
B. Caddy (Forensic Examination of Glass and Paint (c) 2001 and cataloged per British Library; Taylor and Francis Inc. New York).*
Maciejewski et al. [Maciejewski] (Polimery 2004 vol. 49 No. 10 pp. 677-683).*

* cited by examiner

Primary Examiner — Robert S Loewe
(74) Attorney, Agent, or Firm — Sughrue Mion, PLLC

(57) ABSTRACT

There is provided a laminated article having a coating film surface being excellent in sliding property, transparency, abrasion resistance, stain-proofing property and chemical resistance, particularly a laminated article having a silicone rubber substrate. The laminated article comprises a substrate (III), a primer layer (II) provided on the substrate (III) and a top coat layer (I) provided directly on the primer layer (II), in which the top coat layer (I) is formed with a cured article of the top coat composition comprising (A) a curable fluorine-containing resin, (B) a curing agent and (C) a coupling agent comprising a functional group-containing silane coupling agent and/or an aluminum chelating agent, and the primer layer (II) is formed with a primer composition comprising (D) a polydiorganosiloxane, (E) a polyorganosiloxane resin and (F) a coupling agent comprising a functional group-containing silane coupling agent and/or an aluminum chelating agent.

11 Claims, No Drawings

LAMINATED ARTICLE HAVING EXCELLENT STAIN-PROOFING PROPERTY AND INTERLAYER ADHESION AND METHOD OF PRODUCTION OF SAME

TECHNICAL FIELD

The present invention relates to a laminated article which has a coating film surface being excellent in sliding property, transparency, abrasion resistance, stain-proofing property and chemical resistance and possesses enhanced interlayer adhesion, particularly a laminated article having a silicone rubber substrate, and relates to a method of production thereof.

BACKGROUND ART

There are a variety of products required to have sliding property (slipping property) and stain-proofing property on a surface thereof. Particularly a flexible substrate made of silicone rubber is widely used as a protection material for portable terminal represented by a keypad for mobile phone and for a keyboard of office automation system. However staining of a surface thereof is not prevented satisfactorily and sliding property is not maintained sufficiently, and improvement thereof is demanded. For example, JP8-333465A discloses a laminated article produced by applying, on a silicone rubber substrate, a primer comprising an epoxy- or amino-containing trialkoxysilane and then applying a top coat composition comprising an epoxy-containing compound, an amine curing agent and a surfactant. However the laminated article is inferior in adhesion to the substrate, and stain-proofing property of the top coat cannot be expected.

JP2-295012A proposes that stain-proofing property is imparted to a rubber pushbutton by applying a fluorinated hydrocarbon compound on its surface, but there is almost no adhesion between the fluorinated hydrocarbon compound and the rubber substrate, and therefore there is a problem with an effect of keeping up the stain-proofing property.

JP7-220553A proposes that water repellency is imparted to a surface of key top made of an elastomer by applying a fluorine-containing aliphatic polymer thereto. However in this technology, too, there is almost no adhesion between the fluorine-containing aliphatic polymer and the elastomer substrate, and therefore there is a problem with an effect of keeping up the water repellency.

Further JP4-173328A discloses that a fluorine-containing resin such as polytetrafluoroethylene, tetrafluoroethylene/perfluoro(alkyl vinyl ether) copolymer or tetrafluoroethylene/hexafluoropropylene copolymer is applied to an elastic silicone rubber roll through an adhesive. However since a fluorine-containing resin itself has no adhesion, it is necessary that the silicone rubber surface is subjected to chemical conversion treatment to enhance adhesion. In addition, since the rubber roll is made by molding at high temperature, there is no flexibility in mold processing.

DISCLOSURE OF INVENTION

An object of the present invention is to provide a laminated article, in which a top coat layer being excellent in stain-proofing property and sliding property is strongly adhered to a substrate of silicone rubber or the like, and to provide a method of production thereof.

Namely, the present invention relates to a laminated article comprising a substrate (III), a primer layer (II) provided on the substrate (III) and a top coat layer (I) provided directly on the primer layer (II), in which;

the top coat layer (I) is formed with a cured article of a top coat composition comprising (A) a curable fluorine-containing resin, (B) a curing agent and (C) a coupling agent comprising a functional group-containing silane coupling agent and/or an aluminum chelating agent, and the primer layer (II) is formed with a primer composition comprising (D) a polydiorganosiloxane, (E) a polyorganosiloxane resin and (F) a coupling agent comprising a functional group-containing silane coupling agent and/or an aluminum chelating agent.

Also, the present invention relates to a method of producing a laminated article comprising a substrate (III), a primer layer (II) provided on the substrate (III) and a top coat layer (I) provided directly on the primer layer (II), which comprises:

a step for forming a coating film of a primer composition comprising (D) a polydiorganosiloxane, (E) a polyorganosiloxane resin and (F) a coupling agent comprising a functional group-containing silane coupling agent and/or an aluminum chelating agent on the substrate (III) directly or through an intervenient layer, a step for forming an uncured top coat layer by applying a top coat composition comprising (A) a curable fluorine-containing resin, (B) a curing agent and (C) a coupling agent comprising a functional group-containing silane coupling agent and/or an aluminum chelating agent, and a step for curing the uncured top coat layer.

The uncured primer layer and the uncured top coat layer may be subjected to one curing step by two coats/one bake method as mentioned above or may be subjected to curing steps in order by two coats/two bakes method.

Preferred as the curable fluorine-containing resin (A) is a curable fluorine-containing resin having hydroxyl as a curable group because of excellent stain-proofing property and sliding property.

In the case of using, as the curable fluorine-containing resin (A), a curable fluorine-containing resin having hydroxyl as a curable group, it is preferable that the top coat layer (I) contains an isocyanate group-containing silane coupling agent as the coupling agent (C) and the primer layer (II) contains an aluminum chelating agent and/or an amino-containing silane coupling agent as the coupling agent (F), from the viewpoint of good reactivity between the both.

Also when the top coat layer (I) contains an aluminum chelating agent as the coupling agent (C), it is preferable that the primer layer (II) contains an aluminum chelating agent and/or an amino-containing silane coupling agent as the coupling agent (F), from the viewpoint of good reactivity between the both.

Also in order to further enhance sliding property and stain-proofing property of the top coat layer (I), to the top coat layer (I) may be added polytetrafluoroethylene (PTFE) particles, for example, PTFE particles which have a number average molecular weight of not more than 600,000 and do not undergo fibrillation.

The substrate (III) is not limited particularly, and there can be provided a laminated article having sufficient adhesion of a fluorine-containing top coat to a silicone rubber substrate though it has been difficult to form a fluorine-containing top coat on a silicone rubber substrate.

The laminated article of the present invention is useful for a keypad of mobile phone.

BEST MODE FOR CARRYING OUT THE INVENTION

The laminated article of the present invention is characterized in that the laminated article comprises the substrate (III), the primer layer (II) provided on the substrate (III) and the top coat layer (I) provided directly on the primer layer (II), and the specific coupling agents are blended to the top coat layer (I) and the primer layer (II), respectively.

The top coat layer (I) of the present invention is formed with a cured article of the top coat composition comprising the curable fluorine-containing resin (A), the curing agent (B) and the coupling agent (C) comprising a functional group-containing silane coupling agent and/or an aluminum chelating agent.

Examples of the curable fluorine-containing resin (A) are, for instance, as follows.

(A-I) Copolymer of fluorine-containing olefin with non-fluorine-containing monomer having functional group (A-II) Copolymer of fluorine-containing olefin having functional group with fluorine-containing olefin having no functional group (A-III) Blend of fluorine-containing resins having functional group prepared by blending two or more resins (A-IV) Composite resin (seed polymer) prepared by seed-polymerizing non-fluorine-containing monomer having functional group with fluorine-containing resin particles Examples of the fluorine-containing olefin are tetrafluoroethylene (TFE), hexafluoropropylene (HFP), chlorotrifluoroethylene (CTFE), perfluoro(alkyl vinyl ether), trifluoroethylene, vinylidene fluoride (VdF), vinyl fluoride and the like.

Preferred examples of the functional group contained in the curable fluorine-containing resin are hydroxyl, carboxyl, carboxylic acid salt, sulfonic acid group, sulfonic acid salt, epoxy, amino, carbonyl, nitrile and/or alkoxysilyl group.

Also examples of the fluorine-containing olefin having functional group are, for instance, those raised below.

$$CF_2=CF(CF_2)_aZ \quad (i)$$

wherein Z is $SO_3M$ or COOM, in which M is H, $NH_4$ or an alkali metal; a is an integer of from 1 to 10.

Examples thereof are $CF_2=CFCF_2$—COOH and the like.

$$CF_2=CF(CF_2CF(CF_3))_b—Z \quad (ii)$$

wherein Z is $SO_3M$ or COOM, in which M is H, $NH_4$ or an alkali metal; b is an integer of from 1 to 5.

Examples thereof are $CF_2=CFCF_2CF(CF_3)$—COOH, $CF_2=CF(CF_2CF(CF_3))_2$—$COONH_4$ and the like.

$$CF_2=CF—O—(CFRf^3)_c—Z \quad (iii)$$

wherein $Rf^3$ is F or $CF_3$; Z is $SO_3M$ or COOM, in which M is H, $NH_4$ or an alkali metal; c is an integer of from 1 to 10.

Examples thereof are $CF_2=CF—O—CF_2CF_2CF_2COOH$ and the like.

$$CF_2=CF—O—(CF_2CFRf^3O)_d—Z \quad (iv)$$

wherein $Rf^3$ is F or $CF_3$; Z is $SO_3M$ or COOM, in which M is H, $NH_4$ or an alkali metal; d is an integer of from 1 to 10.

Examples thereof are $CF_2=CF—O—CF_2CF(CF_3)OCF_2CF_2COOH$, $CF_2=CF—O—CF_2CF(CF_3)OCF_2CF_2SO_3H$ and the like.

$$CH_2=CFCF_2—O—(CF(CF_3)CF_2O)_e—CF(CF_3)—Z \quad (v)$$

wherein Z is $SO_3M$ or COOM, in which M is H, $NH_4$ or an alkali metal; e is 0 or an integer of from 1 to 10.

Examples thereof are: $CH_2=CFCF_2$—$(CF(CF_3)CF_2O)$—$CF(CF_3)COONH_4$, $CH_2=CFCF_2—O—CF(CF_3)CF_2O—CF(CF_3)COONH_4$ and the like.

$$CF_2=CFCF_2—O—(CF(CF_3)CF_2O)_f—CF(CF_3)—Z \quad (vi)$$

wherein Z is $SO_3M$ or COOM, in which M is H, $NH_4$ or an alkali metal; f is an integer of from 1 to 10.

Examples thereof are $CF_2=CFCF_2O—CF(CF_3)CF_2O—CF(CF_3)COOH$, $CF_2=CFCF_2O—CF(CF_3)CF_2O—CF(CF_3)SO_3H$ and the like.

Among the non-fluorine-containing monomers having functional group, example of non-fluorine-containing monomer having hydroxyl is hydroxyalkyl allyl ether or hydroxyalkyl vinyl ether which is represented by the formula: $CH_2=CHR^1$, wherein $R^1$ is —$OR^2$ or —$CH_2OR^2$, in which $R^2$ is an alkyl group having hydroxyl. Example of $R^2$ is a linear or branched alkyl group having 1 to 8 carbon atoms, in which one to three, preferably one hydroxyl is bonded. Examples thereof are, for instance, 2-hydroxyethyl vinyl ether, 3-hydroxypropyl vinyl ether, 2-hydroxypropyl vinyl ether, 2-hydroxy-2-methylpropyl vinyl ether, 4-hydroxybutyl vinyl ether, 4-hydroxy-2-methylbutyl vinyl ether, 5-hydroxypentyl vinyl ether, 6-hydroxyhexyl vinyl ether, 2-hydroxyethyl allyl ether, 4-hydroxybutyl allyl ether, glycerol monoallyl ether and the like. In addition, there are exemplified allyl alcohol and the like.

Examples of the non-fluorine-containing monomer having alkoxysilyl group are, for instance, vinyl alkoxysilanes such as vinyltrimethoxysilane, vinyltriethoxysilane, vinyltripropoxysilane and vinylmethyldimethoxysilane; and in addition, trimethoxysilylethyl vinyl ether, triethoxysilylethyl vinyl ether, triethoxysilylpropyl vinyl ether, triisopropenyloxysilylethyl vinyl ether, γ-(meth)acryloxypropyltrimethoxysilane and the like.

Examples of the non-fluorine-containing monomer having carboxyl are organic acids having unsaturated group, for instance, carboxyl-containing monomers such as acrylic acid, methacrylic acid, vinylacetic acid, crotonic acid, cinnamic acid, 3-allyloxypropionic acid, itaconic acid, itaconic acid monoester, itaconic acid anhydride, succinic acid anhydride, maleic acid, maleic acid monoester, maleic anhydride, fumaric acid, fumaric acid monoester, vinyl phthalate, vinyl pyromellitate and 10-undecenic acid.

Nonlimiting examples of other non-fluorine-containing monomers having functional group are epoxy-containing monomers such as glycidyl (meth)acrylate, epoxy vinyl and epoxy vinyl ether; amino-containing monomers such as diacetone acrylamide, (meth)acrylamide and N-methylol (meth)acrylamide; nitrile-containing monomers such as (meth)acrylonitrile; and carbonyl-containing monomers such as acrolein, vinyl ethyl ketone and diacetone acrylamide.

Also a monomer having no functional group may be used as a comonomer. For example, there can be used α-olefins such as ethylene, propylene and isobutylene; vinyl ethers such as ethyl vinyl ether (EVE), cyclohexyl vinyl ether (CHVE), butyl vinyl ether, isobutyl vinyl ether, methyl vinyl ether and polyoxyethylene vinyl ether; allyl ethers such as polyoxyethylene allyl ether, ethyl allyl ether and phenyl allyl ether; vinyl esters such as vinyl acetate, vinyl lactate, vinyl butyrate, vinyl pivalate, vinyl benzoate, and VEOVA9 and VEOVA10 (saturated vinyl carboxylates available from Shell Chemical Co., Ltd.); unsaturated dicarboxylic acid esters such as dimethyl maleate; (meth)acrylic acid esters such as methyl methacrylate and butyl acrylate; aromatic vinyl compounds such as styrene and methyl styrene; and the like.

Among the copolymers in the above-mentioned embodiment (A-1), examples of the copolymers having hydroxyl and/or carboxyl are copolymers of the above-mentioned fluorine-containing olefin with the above-mentioned monomer having hydroxyl and/or carboxyl and as case demands, a monomer copolymerizable with those monomers. Representative examples of the monomer having hydroxyl are hydroxybutyl vinyl ether and the like, and representative examples of the monomer having carboxyl are maleic acid and the like. Examples of the other comonomer are alkyl vinyl esters; alkyl vinyl ethers; olefins such as ethylene, propylene and isobutylene; (meth)acrylates; styrene and the like.

There are concretely copolymers disclosed, for example, in JP60-21686B, JP3-121107A, JP4-279612A, JP4-28707A, JP2-232221A, etc. A number average molecular weight (by GPC) of the copolymers is from 1,000 to 100,000, preferably from 1,500 to 30,000. If the molecular weight is less than 1,000, curability and weather resistance tend to be insufficient, and if the molecular weight exceeds 100,000, there is a tendency that problems with workability and coatability arise.

More concretely nonlimiting examples of the copolymers are a TFE/alkyl vinyl ether/4-hydroxybutyl vinyl ether (HBVE) copolymer, CTFE/alkyl vinyl ether/HBVE copolymer, TFE/alkyl vinyl ether/maleic acid copolymer, CTFE/alkyl vinyl ether/maleic acid copolymer, TFE/cyclohexyl vinyl ether/VEOVA10/crotonic acid copolymer and the like.

In the case of the above-mentioned copolymer having hydroxyl, a hydroxyl value thereof is from 1 to 200 (mgKOH/g), preferably from 1 to 150 (mgKOH/g). If the hydroxyl value is decreased, there is a tendency that a curing failure easily arises, and if the hydroxyl value exceeds 200 (mgKOH/g), there is a tendency that a problem with flexibility of a coating film arises.

In the case of the above-mentioned copolymer having carboxyl, an acid value thereof is from 1 to 200 (mgKOH/g), preferably from 1 to 100 (mgKOH/g). If the acid value is decreased, there is a tendency that a curing failure easily arises, and if the acid value exceeds 200 (mgKOH/g), there is a tendency that a problem with flexibility of a coating film arises.

Also the copolymer may be one having both of hydroxyl and carboxyl.

Examples of those copolymers commercially available are for instance, ZEFFLE available from DAIKIN INDUSTRIES, LTD., Lumiflon available from Asahi Glass Kabushiki Kaisha, Cefral Coat available from Central Glass Kabushiki Kaisha, Fluonate available from Dai Nippon Ink Kagaku Kogyo Kabushiki Kaisha, Zaflon available from To a Gosei Kabushiki Kaisha, Fclear available from Kanto Denka Kogyo Co., Ltd. and the like.

Among the fluorine-containing copolymers (A-I) having functional group, examples of the fluorine-containing olefin resin having alkoxysilyl group as a functional group are copolymers disclosed, for example, in JP4-4246A, etc. A number average molecular weight (by GPC) of the copolymers is from 1,000 to 100,000, preferably from 1,500 to 30,000. If the molecular weight is less than 1,000, curability and weather resistance tend to be insufficient, and if the molecular weight exceeds 100,000, there is a tendency that problems with workability and coatability arise.

Concretely there are copolymers such as a copolymer comprising TFE and vinylmethoxysilane and a copolymer comprising TFE and trimethoxysilylethyl vinyl ether.

A content of the alkoxysilyl group of the above-mentioned copolymers is from 1 to 50% by mole, preferably from 5 to 40% by mole. If the content of alkoxysilyl group decreases, a curing failure tends to arise easily, and if the content becomes too large, there is a tendency that a problem with flexibility of a coating film arises.

Examples of the copolymer (A-II) are, for instance, copolymers of TFE/HFP/fluorine-containing monomer having functional group represented by the above-mentioned formulae (i) to (vi) and the like.

Examples of the blend (A-III) are a blend of the copolymers (A-I), a blend of the copolymers (A-II), a blend of the copolymer (A-I) and/or the copolymer (A-II) and the non-fluorine-containing resin having functional group, a blend of the copolymer (A-I) and/or the copolymer (A-II) and the non-fluorine-containing resin having no functional group, a blend of the non-fluorine-containing resin having functional group and the fluorine-containing resin having no functional group and the like.

Examples of the non-fluorine-containing resin having functional group are (co)polymers of the above-mentioned non-fluorine-containing monomers having functional group. Concretely there are preferably acrylic polyol, urethane polyol and the like. Examples of the non-fluorine-containing resin having no functional group are, for instance, an acrylic resin, polyester and the like. Examples of the fluorine-containing resin having no functional group are, for instance, VdF polymers such as VdF homopolymer, VdF/TFE copolymer, VdF/HFP copolymer, VdF/CTFE copolymer, VdF/TFE/CTFE copolymer and VdF/TFE/HFP copolymer; TFE/HFP copolymer; copolymers of a fluorine-containing olefin with a non-fluorine-containing monomer having no functional group (for example, vinyl ethers, vinyl esters, α-olefins, aromatic vinyl compounds) and the like.

A blending ratio may be optionally selected depending on the content of functional groups, fluorine content, etc. It is usually desirable from the viewpoint of an excellent effect of maintaining stain-proofing property that the blending is so carried out that the amount of functional groups is sufficient enough to enable the functional groups to react with the curing agent (B) and further with the coupling agents (C) and (F).

To the top coat composition is blended the curing agent (B) to enhance mechanical properties such as strength and durability of the top coat. The curing agent (B) is selected in consideration of reactivity with the curable functional groups of the curable fluorine-containing resin (A) and the coupling agent (C) explained infra.

When the curable functional group is, for example, hydroxyl, examples of the curing agent is at least one selected from the group consisting of an isocyanate compound, amino compound, epoxy compound, organic acid, hydrazide compound, aziridine compound, carbodiimide compound and/or $Si(OR^3)_4$, in which $R^3$ is a non-fluorine-containing alkyl group having 1 to 10 carbon atoms, $R^4Si(OR^5)_3$, in which $R^4$ and $R^5$ are the same or different and each is a non-fluorine-containing alkyl group having 1 to 10 carbon atoms, and solely condensed oligomers and co-condensed co-oligomers thereof.

Also when the curable functional group is carboxyl, there are an epoxy resin curing agent, amino resin curing agent and the like.

The isocyanate compound curing agents encompass blocked isocyanate compounds. Examples thereof are, for instance, 2,4-tolylene diisocyanate, diphenylmethane-4,4'-diisocyanate, xylylene diisocyanate, isophorone diisocyanate, lysine methyl ester diisocyanate, methylcyclohexyl diisocyanate, trimethylhexamethylene diisocyanate, hexamethylene diisocyanate, n-pentane-1,4-diisocyanate, trimers thereof, adducts and biurets thereof, polymers thereof having at least two isocyanate groups, blocked isocyanates and the like. The isocyanate compound and blocked isocyanate compound are not limited to them.

Instead of or in addition to the isocyanate compound, there are the above-mentioned $Si(OR^3)_4$ and/or $R^4Si(OR^5)_3$, concretely there are, for example, tetraalkoxysilane or partial condensates thereof, alkyltrialkoxysilane or partial condensates thereof and the like.

Examples of tetraalkoxysilane are tetramethoxysilane, tetraethoxysilane, tetrabutoxysilane, partial condensates thereof and the like. As the commercially available tetraalkoxysilane, there can be used MS51, MS56, MS57 and the like available from Mitsubishi Chemical Corporation and ETHYLSILICATE28, ETHYLSILICATE40, ETHYLSILICATE48 and the like available from Colcoat Co., Ltd.

Examples of the amino compound curing agent are, for instance, a melamine resin, urea resin, guanamine resin, amine adduct, polyamide and the like.

Examples of commercially available amino compound curing agent are Cymel available from Mitsui Cytec Co., Ltd., ANCAMIN and Epilink available from Air Products and Chemicals, Inc., Versamin and Versamid available from Henchel, Tohmide and Fujicure available from Fuji Kasei Kogyo Co., Ltd., Versamid available from Dai-Ichi General Kabushiki Kaisha, Epicure available from Japan Epoxy Resins Co., Ltd., Sunmide available from Sanwa Chemical Co., Ltd., Epomate available from Ajinomoto Kabushiki Kaisha and the like.

Examples of the epoxy compound curing agent are, for instance, an epoxy resin, epoxy-modified silane coupling agent and the like. Examples of commercially available epoxy compound curing agent are Epikote and EPIREC available from Japan Epoxy Resins Co., Ltd., Cardolite available from Cardolite Corporation, CoatOSil 1770 and A-187 available from Nippon Dow Corning Toray Co., Ltd. and the like.

Examples of the aziridine compound curing agent are XAMA2 and XAMA7 available from BF-Goodrich Co., Ltd. and the like.

Examples of the hydrazide compound are, for instance, succinic acid dihydrazide, adipic acid dihydrazide, sebacic acid dihydrazide, maleic acid dihydrazide, fumaric acid dihydrazide, phthalic acid dihydrazide, terephthalic acid dihydrazide, isophthalic acid dihydrazide and the like.

Examples of the carbodiimide compound curing agent are Carbodilite available from Nisshinbo Industries, Inc., UCARLNK Crosslinker XL-29SE available from Union Carbide Co., Ltd. and the like.

An adding amount of the curing agent (B) may be optionally selected depending on kind of the curing agent, and is usually from 1 to 200 parts by mass based on 100 parts by mass of the sum of the curable fluorine-containing resin (A) and the coupling agent (C). A preferred upper limit is 100 parts by mass, further 80 parts by mass, and a preferred lower limit is 5 parts by mass, further 10 parts by mass.

To the top coat composition is added the coupling agent (C) comprising a silane coupling agent (Ca) having functional group and/or an aluminum chelating agent (Cb). It can be considered that this coupling agent (C) undergoes functioning of strongly adhering the fluorine-containing top coat layer (I) to the primer layer (II) by an interaction with the coupling agent (F) in the primer layer (II).

Examples of the functional group of the silane coupling agent (Ca) having functional group are, for instance, vinyl, epoxy, mercapto, amino, isocyanate group and the like.

Examples of the silane coupling agent are, for instance, vinyl-containing silane coupling agents such as vinyltrimethoxysilane, vinyltriethoxysilane, vinyltris(β-methoxyethoxy)silane, γ-(methacryloxypropyl)trimethoxysilane and γ-(methacryloxypropyl)triethoxysilane; epoxy-containing silane coupling agents such as β-(3,4-epoxycyclohexyl)ethyltrimethoxysilane, γ-glycidoxypropyltrimethoxysilane, and γ-glycidoxypropylmethyldiethoxysilane; mercapto-containing silane coupling agents such as γ-mercaptopropyltrimethoxysilane; amino-containing silane coupling agents such as γ-aminopropyltrimethoxysilane, γ-aminopropyltriethoxysilane, N-phenyl-γ-aminopropyltrimethoxysilane and N-β-(aminoethyl)-γ-aminopropyltrimethoxysilane; isocyanate group-containing silane coupling agents such as $OCNC_3H_6Si(OCH_3)_3$ and $OCNC_3H_6Si(OC_2H_5)_3$ and besides $(C_2H_5O)_3SiC_3H_6S_4C_3H_6Si(OC_2H_5)_3$ and the like.

When the curable fluorine-containing resin (A) has hydroxyl as a curable functional group, preferred as the silane coupling agent (Ca) having functional group are silane coupling agents having isocyanate group from the viewpoint of excellent stability and coatability of the top coat composition.

Examples of the aluminum chelating agent (Cb) are trialkoxy aluminum compounds such as aluminum isopropylate, mono sec-butoxy aluminum diisopropylate, aluminum sec-butylate and aluminum ethoxide; aluminum chelate compounds such as aluminum ethylacetoacetate diisopropylate, aluminum tris-(ethylacetoacetate), aluminum alkylacetoacetate diisopropylate, aluminum bis-(ethylacetoacetate) mono-(acetylacetonate), aluminum tris-(acetylacetonate), aluminum monoisopropoxy monooleoxy ethylacetoacetate and cyclic aluminum oxide isopropylate and the like.

The aluminum chelating agent (Cb) is advantageous in the case where the curable functional group of the curable fluorine-containing resin is hydroxyl.

An adding amount of the coupling agent (C) may be optionally selected depending on kind of the coupling agent, and is usually from 0.5 to 100 parts by mass based on 100 parts by mass of the sum of the curable fluorine-containing resin (A) and the curing agent (B). A preferred upper limit is 50 parts by mass, further 20 parts by mass, and a preferred lower limit is 1 part by mass, further 5 parts by mass.

To the top coat layer (I) may be blended PTFE particles to further enhance sliding property and stain-proofing property.

The PTFE particles to be blended have property of being non-melt-processable and are excellent in sliding property. PTFE encompasses TFE homopolymer and modified PTFE prepared by copolymerizing other copolymerizable monomer within a range not lowering the property of being non-melt-processable.

Also PTFE having a high molecular weight has property of undergoing fibrillation (to be formed into fiber) when a shearing force is applied thereto. In the case of aiming at improving sliding property, PTFE having a low molecular weight which does not undergo fibrillation or hardly undergo fibrillation is advantageous. For example, PTFE having a low molecular weight which has a number average molecular weight of not more than 600,000, preferably not more than 500,000 is preferred. An upper limit of an average particle size of PTFE particles is 100 μm, preferably 50 μm, particularly preferably 15 μm from the point of keeping transparency, and the average particle size is not less than 0.1 μm, preferably not less than 1 μm, particularly preferably not less than 3 μm from the viewpoint of easy dispersion.

In order to exhibit an effect of improving sliding property, it is necessary that the PTFE particles are contained in an amount of not less than 5 parts by mass, preferably not less than 7 parts by mass, particularly preferably not less than 10 parts by mass based on 100 parts by mass of the curable fluorine-containing resin (A). An upper limit thereof is 30 parts by mass, preferably 25 parts by mass, particularly preferably 20 parts by mass from the point of maintaining transparency and abrasion resistance.

Also in order to improve dispersibility of the PTFE particles, it is preferable to add an organopolysiloxane fluid. The organopolysiloxane fluid to be used is in the form of liquid at normal temperature and is compatible with the organic solvent to be used. For example, either of so-called a straight organopolysiloxane fluid and a modified organopolysiloxane fluid can be used.

Examples of the straight organopolysiloxane fluid are, for instance, dimethylpolysiloxane, methyl phenyl polysiloxane, methyl hydrogen polysiloxane and the like. Particularly dimethylpolysiloxane is preferred from the viewpoint of applicability for various uses.

Examples of the modified organopolysiloxane fluid are, for instance, amino-containing organopolysiloxane, epoxy-containing organopolysiloxane, carboxyl-containing organopolysiloxane, methacryl-containing organopolysiloxane, mercapro-containing organopolysiloxane, phenol-containing organopolysiloxane and the like. From the viewpoint of excellent dispersibility, amino-containing organopolysiloxane is preferred. An amino equivalence of amino-containing organopolysiloxane is preferably not less than 100 and not more than 6,000.

An adding amount of the organopolysiloxane fluid is from 0.05 to 5 parts by mass based on 100 parts by mass of the curable fluorine-containing resin (A). A preferred lower limit thereof is 0.1 part by mass, particularly 0.2 part by mass. A preferred upper limit thereof is 4 parts by mass, particularly 3 parts by mass. Even in the case of not blending the PTFE particles, an organopolysiloxane fluid may be blended to improve stain-proofing property and sliding property.

Also in order to further enhance stain-proofing property, a stain-proofing agent such as organopolysiloxane having functional group or fluorine-containing polyether having functional group may be blended.

The organopolysiloxane having functional group as a stain-proofing agent is an oligomer or cooligomer which has not less than two, preferably not less than ten and not more than 10,000, preferably not more than 1,000 of siloxane units having the same kind of or different kinds of alkyl groups, aryl groups or arylalkyl groups. Examples thereof are compounds having, as the functional group ($Y^1$) contained in the above-mentioned alkyl group, aryl group or arylalkyl group, one or more, preferably not more than 1,000 of hydroxyl, amino, epoxy, carboxyl, thiol, $-(C_2H_4O)_a-(C_3H_6O)_bR^{20}$, wherein $R^{20}$ is hydrogen atom or an alkyl group or acyl group having 1 to 8 carbon atoms, a is an integer of from 1 to 40, and b is 0 or an integer of from 1 to 40, and/or alkoxysilyl groups.

Preferred as the alkoxysilyl group are silicon-containing functional groups represented by $-SiR^{21}_{3-m}(OR^{22})_m$, wherein $R^{21}$ is a non-hydrolyzable hydrocarbon group which has 1 to 18 carbon atoms and may have fluorine atom, $R^{22}$ is a hydrocarbon group having 1 to 18 carbon atoms, m is an integer of 1 to 3.

Examples of $R^{21}$ are, for instance, methyl, ethyl, propyl and the like.

Examples of $R^{22}$ are, for instance, methyl, ethyl, propyl and the like, and methyl is preferred particularly from the viewpoint of excellent reactivity (hydrolyzability). While m is an integer of from 1 to 3, m is preferably 3 from the viewpoint of excellent hydrolyzability.

The organopolysiloxane having functional group is concretely represented by the formula (1):

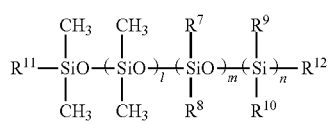

(1)

wherein $R^7$, $R^8$, $R^9$, $R^{10}$, $R^{11}$ and $R^{12}$ are the same or different and each is an alkyl group having 1 to 8 carbon atoms, Rf group (Rf is a linear or branched fluorine-containing alkyl group which has 1 to 18 carbon atoms and may have the above-mentioned functional group $Y^1$, and may have oxygen atom and/or nitrogen atom in the midst of the chain), or $-R^{13}-Y^1$ ($R^{13}$ is a divalent hydrocarbon group which has 0 to 14 carbon atoms and may have oxygen atom and/or nitrogen atom, and $Y^1$ is the above-mentioned functional group), and at least one of $R^7$, $R^8$, $R^9$, $R^{10}$, $R^{11}$ and $R^{12}$ has the functional group $Y^1$; l is an integer of 1 to 10,000, m is an integer of 1 to 1,000, n is 0 or an integer of 1 to 10,000.

$R^7$, $R^8$, $R^9$, $R^{10}$, $R^{11}$ and $R^{12}$ are non-hydrolyzable groups. Preferred examples thereof are an alkyl group having no functional group such as $CH_3$, $C_2H_5$ or $C_3H_7$; an alkyl group having functional group such as $Y^1-CH_2-$, $Y^1-CH_2CH_2-$ or $Y^1-CH_2CH_2CH_2-$; a fluorine-containing ether group or fluorine-containing alkyl group having no functional group such as $-CH_2-Rf^1$ or $-CH_2CH_2-Rf^1$ ($Rf^1$ is a fluorine-containing alkyl group which has no functional group $Y^1$ and has 1 to 18 carbon atoms or a fluorine-containing ether group which has no functional group $Y^1$ and has 1 to 25 carbon atoms); a fluorine-containing ether group or fluorine-containing alkyl group having functional group such as $-CH_2-Rf^2$, $-CH_2CH_2-Rf^2$ or $-CH_2CH_2CH_2-Rf^2$ ($Rf^2$ is a fluorine-containing alkyl group which has the functional group $Y^1$ and has 1 to 18 carbon atoms or a fluorine-containing ether group which has the functional group $Y^1$ and has 1 to 25 carbon atoms); and the like. Examples of $Rf^1$ are as follows.

(1) Fluorine-containing alkyl group having no functional group $Y^1$
$C_4F_9C_2H_4-$, $C_8F_{17}C_2H_4-$, $C_9F_{19}C_2H_4-$, $C_4F_9SO_2N(CH_3)C_2H_4-$, $C_4F_9C_2H_4N(CH_3)C_3H_9-$ and the like.

(2) Fluorine-containing ether group having no functional group $Y^1$
$CF_3OCF_2CF_2O-C_2H_4-$, $CF_3(CF_2CF_2O)_2-C_2H_4-$, $CF_3O(CF_2)_2-(CF_2CF_2O)_2-$, $CF_3CF_2O(CF_2CF_2CF_2O)_7-$, $F-(C_3F_6O)_6-(C_2F_4O)_2-$ and the like.

Examples of $Rf^2$ are as follows.

(3) Fluorine-containing alkyl group having the functional group $Y^1$
$HOC_2H_4CF_2CF_2CF_2CF_2C_2H_4-$, $HOOCCF_2CF_2CF_2CF_2C_2H_4-$ and the like.

(4) Fluorine-containing ether group having the functional group $Y^1$
$HOCH_2CF_2O(CF_2CF_2O)_3-C_2H_4-$, $HOOCCF_2O(CF_2CF_2O)_3-C_2H_4-$ and the like.

From the viewpoint of excellent water- and oil-repellency, at least one of them is preferably the fluorine-containing alkyl group having no functional group $Y^1$ or fluorine-containing ether group having no functional group $Y^1$.

Examples of the functional group $Y^1$ are those mentioned supra. It is preferable that the functional group $Y^1$ is so bonded as in the forms mentioned below:

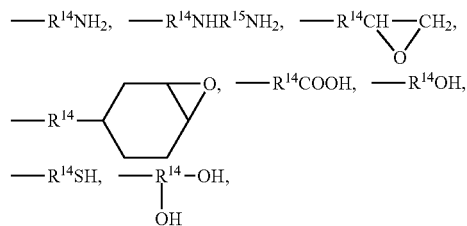

-continued $$-R^{14}-(C_2H_4O)_a(C_3H_6O)_bR^{20}, \text{ and}$$

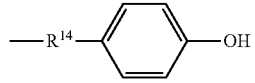

wherein $R^{20}$, a and b are as defined above, $R^{14}$ is a bond or an alkylene group having from 1 to 8 carbon atoms, $R^{15}$ is an alkylene group having from 2 to 8 carbon atoms.

Nonlimiting examples of commercially available organopolysiloxane which are classified by kind of the functional group $Y^1$ are as follows.

When the functional group $Y^1$ is OH:
Silaplaine FM-4421, FM-0421, FM-0411, FM-0425, FM-DA11, FM-DA21 and the like available from Chisso Corporation
KF-6001, KF-6002, X-22-4015, X-22-176DX and the like available from Shin-Etsu Chemical Co., Ltd.

When the functional group $Y^1$ is $NH_2$ or $-R^{14}-NH-R^{15}-NH_2$:
Silaplaine FM-3321, FM-3311, FM-3325 and the like available from Chisso Corporation
KF-860, KF-861, KF-865, KF-8002, X-22-161B and the like available from Shin-Etsu Chemical Co., Ltd.
FZ-3501, FZ-3789, FZ-3508, FZ-3705, FZ-4678, FZ-4671, FZ-4658 and the like available from Dow Corning Toray Co., Ltd.

When the functional group $Y^1$ is epoxy:
Silaplaine FM-0521, FM-5521, FM-0511, FM-0525 and the like available from Chisso Corporation
KF-101, X-22-163B, X-22-169B and the like available from Shin-Etsu Chemical Co., Ltd.
L-9300, FZ-3736, FZ-3720, LE-9300, FZ-315 and the like available from Dow Corning Toray Co., Ltd.

When the functional group $Y^1$ is COOH:
X-22-162C, X-22-3701E and the like available from Shin-Etsu Chemical Co., Ltd.
FZ-3703 and the like available from Dow Corning Toray Co., Ltd.

When the functional group $Y^1$ is SH:
KF-2001, X-22-167B and the like available from Shin-Etsu Chemical Co., Ltd.

When the functional group $Y^1$ is $-(C_2H_4O)_a(C_3H_6O)_bR^{20}$:
KF-353, KF-355A, KF-6015 and the like available from Shin-Etsu Chemical Co., Ltd.

Then the fluorine-containing polyether having functional group as a stain-proofing agent is explained below.

The fluorine-containing polyether having functional group is a fluorine-containing polyether having at least one functional group $Y^2$. Examples of the functional group $Y^2$ are hydroxyl, amino, epoxy, carboxyl, thiol, nitrile, iodine atom and/or an alkoxysilyl group.

As the fluorine-containing polyether having functional group, preferred are, for example, fluorine-containing polyethers having functional group represented by the formula (2):

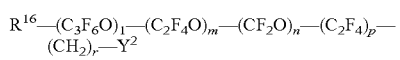

wherein $R^{16}$ is H, F, an alkyl group having from 1 to 8 carbon atoms, a perfluoroalkoxy group represented by $C_qF_{2q+1}O-$ (q=1 to 15) or $Y^2-(CH_2)_s-C_qF_{2q}O-$, in which s is 0 or an integer of from 1 to 200; $Y^2$ is as defined above; l, m, n, p and r are the same or different and each is 0 or an integer of from 1 to 200 and there is no case where all of l, m, n, p and r are zero.

Examples of $R^{16}$ are, for instance, H or F; a non-fluorine-containing alkyl group having 1 to 8 carbon atoms such as methyl, ethyl, propyl or butyl; a perfluoroalkoxy group having 1 to 15 carbon atoms such as $CF_3O-$ or $C_2F_5O-$; $Y^2-(CH_2)_s-C_qF_{2q}O-$, in which s is 0 or an integer of from 1 to 200 and the like. Particularly preferred is a perfluoroalkoxy group from the viewpoint of excellent water- and oil-repellency.

Examples of the functional group $Y^2$ are those mentioned above, and it is preferable that the functional group $Y^2$ is bonded in the forms raised below.

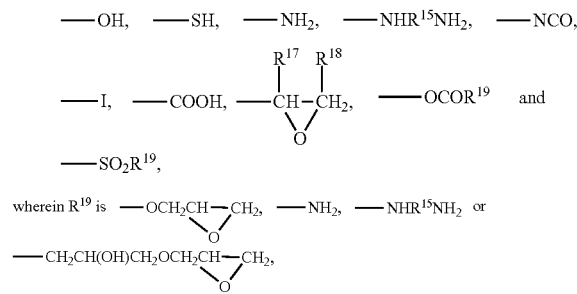

wherein $R^{19}$ is $-OCH_2CH-CH_2$, $-NH_2$, $-NHR^{15}NH_2$ or $-CH_2CH(OH)CH_2OCH_2CH-CH_2$, in which $R^{15}$ is as defined above, $R^{17}$ and $R^{18}$ are the same or different and each is H or an alkyl group having 1 to 4 carbon atoms.

Nonlimiting examples of the oligomer which are classified by kind of the functional group $Y^2$ are as follows.

When the functional group $Y^2$ is OH:
$F(C_3F_6O)_nCF_2CF_2CH_2OH$ (n=10 to 14),
$HOCH_2CF_2O(CF_2CF_2O)_n-(CFO)_m-CF_2CH_2OH$ (an average of n is 25 and an average of m is 5) and the like.

When the functional group $Y^2$ is $NH_2$ or $-NH-R^{15}-NH_2$:
$F(C_3F_6O)_nCF_2CF_2CH_2NH_2$ (an average of n is 12) and the like.

When the functional group $Y^2$ is epoxy:

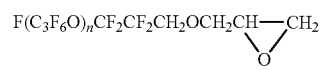

(an average of n is 16) and the like.

When the functional group $Y^2$ is COOH:
$F(C_3F_6O)_nCF_2CF_2COOH$ (an average of n is 25) and the like.

When the functional group $Y^2$ is I (iodine):
$F(C_3F_6O)_nCF_2CF_2I$ (an average of n is 10) and the like.

In addition, there can be used those disclosed, for example, in U.S. Pat. No. 5,279,820.

An adding amount of the stain-proofing agent is from 0.01 to 20 parts by mass based on 100 parts by mass of the curable fluorine-containing resin (A) and a preferable lower limit is 0.1 part by mass. An upper limit thereof is preferably 10 parts by mass.

An organic solvent used for preparing the solvent type top coat composition is not limited particularly, and may be optionally selected depending on the curable fluorine-containing resin. Nonlimiting example of the organic solvent is a polar organic solvent such as an ester solvent, alcohol solvent, ether solvent or ketone solvent; a non-polar organic solvent such as an aromatic hydrocarbon solvent, aliphatic hydrocarbon solvent or petroleum solvent; or a solvent mixture thereof.

Examples of the ester solvent are, for instance, butyl acetate, acetic ester, cellosolve acetate, methoxybutyl acetate and the like; examples of the alcohol solvent are methanol, ethanol, butanol, isopropyl alcohol, benzyl alcohol and the like; examples of the ether solvent are cellosolve, butyl cellosolve, methyl cellosolve, butyl carbitol and the like; and examples of the ketone solvent are methyl ethyl ketone, dimethyl ketone, acetone and the like.

Also examples of the aromatic hydrocarbon solvent are benzene, toluene, xylene and the like, and examples of the aliphatic hydrocarbon solvent are hexane, heptane, octane and the like.

In addition to the PTFE particles, a known solid lubricant and usual additives to be blended to solvent type coating compositions may be blended to the top coat composition in amounts not lowering an effect of the present invention. Examples of the additives are pigment, ultraviolet ray absorber, leveling agent, surfactant, thickener, anti-foaming agent, antioxidant, anti-skinning agent and the like.

The top coat composition can be prepared by known methods such as a dispersion mixing method by grinding with a sand mill (a method of uniform mixing by putting beads in a mixer), a dispersion mixing method with a disperser (a method of dispersion mixing simply by stirring), a dispersion mixing method with a ball mill, a dispersion mixing method with a Centrimill, a dispersion mixing method with a roll mill and the like.

In the present invention, the mentioned top coat composition is applied on the primer layer (II) provided on the substrate (III) and then curing the composition to form the top coat layer (I).

In the primer layer (II) of the laminated article of the present invention, the coupling agent (F) comprising a functional group-containing silane coupling agent (Fa) and/or an aluminum chelating agent (Fb) is blended to the composition comprising the polydiorganosiloxane (D) and the polyorganosiloxane resin (E).

The primer composition forming the primer layer (II) is prepared by adding the coupling agent (F) comprising the functional group-containing silane coupling agent (Fa) and/ or the aluminum chelating agent (Fb) to the polydiorganosiloxane (D) and the polyorganosiloxane resin (E).

Examples of the functional group-containing silane coupling agent (Fa) and the aluminum chelating agent (Fb) are the same as the functional group-containing silane coupling agent (Ca) and the aluminum chelating agent (Cb), respectively for the top coat explained supra.

Since the coupling agent (F) for primer is less affected by the functional group of the curable fluorine-containing resin (A), even if the curable fluorine-containing resin (A) has hydroxyl, an amino-containing silane coupling agent can be used as the functional group-containing silane coupling agent (Fa).

Also the coupling agent (C) for the top coat may be the same as or different from the coupling agent (F) for the primer.

The polydiorganosiloxane (D) which is a component of the primer composition substantially comprises repeating units of $R^2SiO_{2/2}$ siloxane unit, and has a viscosity of not less than 100 mPa·s at 25° C. The polydiorganosiloxane (D) can be one having a viscosity exceeding 1,000,000 mPa·s, typically one in the form of gum. The polydiorganosiloxane in the form of gum is represented by a degree of plasticity (a degree of plasticity measured by the method specified in JIS K6249: a value obtained by applying a load of 1 kgf on a 4.2 g of a spherical sample at 25° C. for three minutes) rather than by a viscosity. The degree of plasticity is preferably within a range of 50 to 200, particularly preferably 80 to 180. The organic group R may be the same as the R mentioned infra, and is preferably methyl or phenyl. It is preferable that the polydiorganosiloxane has a reactive group such as hydroxyl or vinyl at its end or on its side chain.

The polyorganosiloxane resin (E) which is a component of the primer composition substantially comprises $R_3SiO_{1/2}$ siloxane unit and $SiO_{4/2}$ siloxane unit, and a molar ratio of $R_3SiO_{1/2}$ unit to $SiO_{4/2}$ unit is within a range of 0.5 to 1.5, preferably 0.6 to 0.9. The polyorganosiloxane resin may contain $R_2SiO_{2/2}$ unit and $RSiO_{3/2}$ unit. However the total content of $R_3SiO_{1/2}$ unit and $SiO_{4/2}$ unit in this component is preferably not less than 50% by mass, further preferably not less than 80% by mass, particularly preferably 100% by mass, namely, it is most preferable that the polyorganosiloxane resin consists of these two units.

In the above-mentioned formula, the organic group R is a substituted or un-substituted monovalent hydrocarbon group. Examples thereof are, for instance, an alkyl group such as methyl, ethyl, propyl, butyl, pentyl or heptyl; an alkenyl group such as vinyl, allyl, butenyl or pentenyl; an aryl group such as phenyl, tolyl or xylyl; an arylalkyl group such as benzyl or phenethyl; and a halogenated alkyl group such as chloromethyl, 3-chloropropyl or 3,3,3-trifluoropropyl. Particularly methyl, vinyl and phenyl are preferred. This polyorganosiloxane usually has hydrolyzable group or hydroxyl bonded to silicon atom according to its preparation process. Preferred is polyorganosiloxane having at least 0.01% by mass of hydrolyzable group or hydroxyl bonded to silicon atom. In this case, examples of the hydrolyzable group are, for instance, alkoxy groups such as methoxy, ethoxy and propoxy; acetoxy group; isopropenoxy group; and aminoxy group.

The components (D) and (E) can be used as a mixture obtained by simply mixing, and the components (D) and (E) subjected to partial condensation reaction can also be used. A mass ratio of the component (D) to the component (E) is within a range of 1:9 to 9:1, preferably 3:7 to 7:3.

Examples of a method of subjecting those components to partial condensation reaction are, for instance, a method of partial condensation reaction by heating, a method of partial condensation reaction in the presence of a catalyst such as a basic group such as potassium hydroxide or barium hydroxide; ammonia water; an amine such as methylamine, ethylamine or propylamine; a titanium compound such as tetrabutyltitanate or tetraisobutyltitanate; a tin compound such as octyltindiacetate; hexamethyldisilazane; acid such as hydrochloric acid, sulfonic acid or trifluoromethanesulfonic acid; or the like.

When selecting kind of polymer of the components (D) and (E) and changing a blending ratio thereof, optimization of the primer for enhancing adhesion can be obtained, and further when the above-mentioned mixture or partial condensate is subjected to crosslinking reaction by adding an organic peroxide thereto, mechanical properties can be additionally enhanced. Nonlimiting examples of the organic peroxide for the crosslinking reaction are concretely dimethylethylketone peroxide, dichlorohexanone peroxide, dimethylchlorohexanone peroxide, methyl acetoacetate peroxide, acetylacetone peroxide, 1,1-bis(tetrabutylperoxy)cyclohexane, 1,1-bis(tetrahexylperoxy)cyclohexane, 1,1-bis(tetrabutylperoxy)cyclododecane, p-menthane hydroperoxide, diisopropylbenzene hydroperoxide, cumyl hydroperoxide, tetrahexyl hydroperoxide, dicumyl peroxide, tetrabutylcumyl peroxide, ditetrabutyl peroxide, diisobutyl peroxide, dioctanol peroxide, m-toluoylbenzoyl peroxide, dibenzoyl peroxide, di-m-toluoyl peroxide, diisopropyl peroxydicarbonate, di-n-butyl peroxydicarbonate, cumylperoxyneodecanoate, tetra-butyl peroxyneodecanoate, tetra-butyl peroxyisobutyrate, tetrahexyl peroxyisopropyl monocarbonate, tetra-butyl peroxyisopropyl monocarbonate, tetra-hexyl peroxybenzoate, tetra-butyl peroxybenzoate, tetra-butyl peroxyacetate, tetra-butyl trimethylsilyl peroxide and the like.

An adding amount of the organic peroxide is preferably not more than 10% by mass, further preferably not more than 5% by mass based on the sum of the components (D) and (E).

When the polydiorganosiloxane of the component (D) has vinyl group, optimum properties can be obtained similarly by carrying out crosslinking reaction by adding a crosslinking agent (hydrogen polysiloxane having, in average, two or more hydrogen atoms bonded to silicon atoms in one molecule thereof) and a catalyst (platinum catalyst) instead of the above-mentioned organic peroxide. The hydrogen polysiloxane used as a crosslinking agent is a polyorganosiloxane having, in average, two or more hydrogen atoms bonded to silicon atoms in one molecule thereof, and hydrogen atoms in the component are bonded, for example, at an end of its molecular chain and/or in a side chain of its molecular chain. Examples of a group bonded to silicon atom other than hydrogen atom are substituted or un-substituted monovalent hydrocarbon groups except alkenyl groups, for example, alkyl groups such as methyl, ethyl, propyl, butyl, pentyl, hexyl and heptyl; aryl groups such as phenyl, tolyl, xylyl and naphthyl; arylalkyl groups such as benzyl and phenethyl; and halogenated alkyl groups such as chloromethyl, 3-chloropropyl and 3,3,3-trifluoropropyl. Particularly methyl and phenyl are preferred. Examples of molecular structure of such a polyorganosiloxane are, for instance, linear form, branched form, cyclic form, net form and linear form partly branched, and particularly a linear form is preferred. Also a viscosity at 25° C. is not limited particularly, and is preferably within a range of 0.1 to 500,000 mPa·s, particularly preferably within a range of 1 to 100,000 mPa·s. When adding hydrogen polysiloxane as a crosslinking agent, it is preferable that the amount of hydrogen atoms bonded to silicon atoms in the crosslinking agent is within a range of 0.5 to 150.0 mole, particularly preferably 0.7 to 140.0 mole based on 1 mole of the sum of vinyl groups in the component (D).

In that case, a platinum catalyst is suitable as a catalyst. Examples thereof are chloroplatinic acid, alcohol solution of chloroplatinic acid, carbonyl complex of platinum, alkenylsiloxane complex of platinum and olefin complex of platinum. Particularly an alkenylsiloxane complex of platinum is preferred. In the alkenylsiloxane complex of platinum, examples of alkenylsiloxane are, for instance, 1,3-divinyl-1,1,3,3-tetramethyldisiloxane and 1,1,3,3-tetravinyl-1,3-dimethyldisiloxane. An amount sufficient for accelerating the reaction suffices for the catalyst, and the amount in a mass unit of platinum metal is within a range of 0.1 to 1,000 ppm, preferably within a range of 1 to 500 ppm.

In the present invention, like the above-mentioned partial condensation reaction, it is not always necessary to carry out the crosslinking reaction with an organic peroxide or a platinum catalyst.

The coupling agent (F) may be added to the component (D) and/or the component (E) anytime during period of preparation of the primer composition, but is preferably added to them promptly before the primer composition is applied to the substrate (III) to prolong its pot life.

An adding amount of the coupling agent (F) is preferably not less than 0.1 part by mass, further preferably not less than 1 part by mass, particularly preferably not less than 2 parts by mass, and preferably not more than 100 parts by mass, further preferably not more than 70 parts by mass, particularly preferably not more than 50 parts by mass based on 100 parts by mass of the components (D) and (E). If the adding amount is smaller than the above-mentioned range, adhesion to the top coat layer tends to be insufficient, and if the adding amount is too large, there is a tendency that a viscosity is increased and coatability and adhesion are lowered.

Also the primer composition may contain an organic solvent such as toluene, xylene, hexane, heptane, acetone, methyl ethyl ketone or methyl isobutyl ketone, an antioxidant, a pigment and/or an inorganic powder and a stabilizer. The organic solvent is usually used to make the coating of the primer composition easy. In that case, it is desirable to employ a drying step for evaporating the organic solvent, after applying the primer composition and before forming the top layer. At the drying step, there is a case where optimization of the primer such as enhancement of adhesion thereof advances.

The substrate (III) is not limited particularly, and inorganic or organic substrates can be used. Examples of the inorganic substrate are, for instance, metals (aluminum, steel plate, stainless steel, zinc plate, copper, brass, chromium, tin plate, etc.), ceramics (alumina, zirconia, aluminum nitride, silicon nitride, silicon carbide, sialon, etc.), glass and the like. Examples of the organic substrate are plastics (polycarbonate, hard vinyl chloride resin, acrylic resin, FRP, ABS, polyethylene terephthalate, polyethylene, polypropylene, polystyrene, polyacetal, polyamide and other various synthetic resin coating films), elastomers (nitrile rubber, silicone rubber, urethane rubber, ethylene propylene rubber, isoprene rubber, butadiene rubber, SBR, natural rubber, fluorine-containing rubber, etc.), leathers (artificial leathers, synthetic leathers and natural leathers), natural materials (stone, wood, leather, etc.) and the like.

These substrates (III) may be previously subjected to surface treatment or may be previously coated. Further the substrates may be those subjected to printing of characters or patterns.

The laminated article of the present invention comprises the substrate (III), the primer layer (II) which is a coating film of the above-mentioned primer composition and the top coat layer (I) which is formed directly on the primer layer (II) by applying and curing the above-mentioned top coat composition. The laminated article can be produced by the method of two coats/one bake or two coats/two bakes mentioned below.

The two coats/one bake method is characterized by comprising:
a step for forming a coating film by applying the primer composition comprising the polydiorganosiloxane (D), the polyorganosiloxane resin (E) and the coupling agent (F) comprising a functional group-containing silane coupling agent and/or an aluminum chelating agent on the substrate (III) directly or through an intervenient layer, a step for forming an uncured top coat layer on the primer layer by applying the top coat composition comprising the curable fluorine-containing resin (A), the curing agent (B) and the coupling agent (C) comprising a functional group-containing silane coupling agent and/or an aluminum chelating agent, and a step for curing the uncured top coat layer.

The two coats/two bakes method is characterized by comprising:
a step for forming a coating film by applying the primer composition comprising the polydiorganosiloxane (D), the polyorganosiloxane resin (E) and the coupling agent (F) comprising a functional group-containing silane coupling agent and/or an aluminum chelating agent on the substrate (III) directly or through an intervenient layer, a step for subjecting the coating film to drying or crosslinking reaction, a step for forming an uncured top coat layer on the primer layer by applying the top coat composition comprising the curable fluorine-containing resin (A), the curing agent (B) and the coupling agent (C) comprising a functional group-containing silane coupling agent and/or an aluminum chelating agent, and a step for curing the uncured top coat layer.

In either of the production methods, known coating methods such as a roll coat method, dip coat method, knife coat method, spray coat method, shower coat method, brush coating and roller coating can be employed.

The curing method and conditions are not limited particularly, and conditions and method suitable for the curing agent (B) can be employed. For example, in the case of curing by heating, the curing is carried out by heating at 60° to 200° C. for 1 to 60 minutes.

The laminated article of the present invention can be used, for example, for the following products.

Electric Appliances:

Casings for various electric appliances; CD tray for audio system; damper for room air conditioner; suction port, slide switch, etc. of vacuum cleaner; outer package, keypad, etc. of mobile phone; shutter, diaphragm, cylindrical zoom lens hood, etc. of camera, disposable camera and digital camera; release lever, link mechanism, etc. of video camera; button, switch, etc. of electric appliances IT-Related System:

Frame, keyboard, CD tray, mouse pad, button, switch, etc. of personal computer

Office Automation System:

Roll, outer package, paper cassette, paper portion, sorter portion, etc. of copying machine, printer and facsimile machine Cooking Facilities:

Range surface, range hood panel, sink, doors of various storages, piston of refrigerator, link mechanism of ventilation fan, sliding shaft of oven, gas cock, hinge of gas range, pop-up mechanism of toaster, etc.

Car-Related Products:

Dash board, thrust washer, ball bearing, piston, piston ring, gear, seat, wiper, air bag, etc.

Industrial Machine-Related Products:

Bearing, sliding parts, sliding parts of centrifugal clutch, bushing of adjustable vane parts of jet engine turbine, washer, thrust washer, seal thrust washer, piston, piston ring, gear, etc.

Furniture:

Table, chair, mirror, etc.

Building-Related Material

Material for tent roof, material for dome roof, sealing material for building, etc.

Others:

Cosmetic case, comb, bath tub, mirror in bath room, closet stool, outdoor electric light, door of car, nursing facilities, etc.

Among the above-mentioned products, the laminated article is useful particularly for products having a substrate made of elastomer (rubber), for example, buttons, switches, etc. of various electric appliances; button, keypad, mouse pad etc. of telephone set, portable calculator, personal computer and digital camera; substrates of electronic devices; roll, etc. of copying machine and printer; hose, dash board, seat, wiper, washer, thrust washer, seal thrust washer, etc. for car; cosmetic case, comb, etc.; sealing materials for building, etc.

The present invention is then explained below by means of examples, but is not limited to those examples. Hereinafter "%" and "part" represent "% by mass" and "part by mass", respectively.

Each component used in Examples and Comparative Examples are as follows.

[Top Coat Composition]
(Curable Fluorine-Containing Resin (A))

A1: Butyl acetate solution of 50% by mass of TFE/IB/VPi/VBz/HBVE (=45/26/9/5/15% by mole) prepared by the following process Into a 1,000 ml stainless steel autoclave were poured 250 g of butyl acetate, 18 g of vinyl pivalate (VPi), 50 g of 4-hydroxybutyl vinyl ether (HBVE), 20 g of vinyl benzoate (VBz) and 4.0 g of isopropoxycarbonyl peroxide, followed by water-cooling to 0° C. and then deairing under reduced pressure. Thereto were added 40 g of isobutylene (IB) and 142.0 g of tetrafluoroethylene (TFE), and the mixture was heated to 40° C. with stirring for reaction for 25 hours. When the inside pressure of the reactor decreased from 0.44 MPaG (4.5 kg/cm$^2$G) to 0.24 MPaG (2.4 kg/cm$^2$G), the reaction was terminated. The obtained curable fluorine-containing copolymer was analyzed by $^{19}$F-NMR, $^1$H-NMR and elemental analyses, and was found to be a copolymer comprising 45% by mole of TFE, 26% by mole of IB, 9% by mole of VPi, 5% by mole of VBz and 15% by mole of HBVE. A number average molecular weight (Mn) thereof measured by GPC was 2×10$^4$.

A2: Butyl acetate solution of 50% by mass of TFE/HBVE/VBz/vinyl versatate (VV-9. VEOVA-9 available from Shell Chemical Co., Ltd.) copolymer (TFE/HBVE/VBz/VV-9=45/10/5/40% by mole, number average molecular weight: 1.5×10$^4$) prepared in the same manner as A1

A3: Butyl acetate solution of 50% by mass of chlorotrifluoroethylene (CTFE)/HBVE/IB/VPi copolymer (CTFE/HBVE/IB/VPi=44/7/34/15% by mole, number average molecular weight: 3.5×10$^4$) prepared in the same manner as A1

A4: Butyl acetate solution of 50% solid content of curable acrylic resin comprising t-butyl acrylate and 2-hydro ethyl methacrylate (90/10 in mass ratio) for comparison (Curing Agent (B))

B1: Isocyanate curing agent (Desmodur N3800 available from Sumitomo Bayer Kabushiki Kaisha)

(Curing Catalyst)

DBTDL: 1% Butyl acetate solution of dibutyltindilaurate (Coupling Agent (C))

Ca: $OCNC_3H_6Si(OC_2H_5)_3$ (Organopolysiloxane Fluid)

Amino-containing organopolysiloxane (modified side chain type, viscosity: 1,200 mm$^2$/s, amino equivalence: 1,800)

[Primer Composition]

(Primer Base)

The primer base (58% by mass xylene solution) was prepared by the following process.

Into a 500 ml glass flask equipped with a reflux condenser and stirrer was poured 39.8 g of xylene while replacing the inside of the flask with nitrogen. Then 66.6 g of crude rubber (plasticity=135) of polydimethylsiloxane having hydroxyl at both ends of its molecular chain was slowly poured thereto with stirring and was completely dissolved. Subsequently 92.4 g of diluted xylene solution of 70% by mass of polymethylsiloxane resin comprising $(CH_3)_3SiO_{1/2}$ unit and $SiO_{4/2}$ unit and having a molar ratio of $(CH_3)_3SiO_{1/2}$ unit to $SiO_{4/2}$ unit of 0.7 was poured thereto. After the mixture became uniform, 1.2 g of a trifluoromethanesulfonic acid which was a catalyst was poured into the mixture. While continuing the stirring, the reactor was heated in an oil bath up to a reflux temperature, and condensation reaction was carried out for 180 minutes in such a condition. Then the heating was stopped, and while continuing the stirring, the reactor was allowed to stand for cooling until the inside temperature of the reactor was decreased to normal temperature, to obtain a reaction mixture.

(Coupling Agent (F))
Fa: γ-Aminopropyltriethoxysilane
Fb: 76% Isopropanol solution of aluminum bis-(ethylacetoacetate)mono(acetylacetate) (common name: Alumichelate D)
(Organic Peroxide for Crosslinking Reaction of Primer)
Organic peroxide 1: 40% Toluene solution of benzoyl peroxide
Organic peroxide 2: Peroxide curing agent (NYPER BMT available from NOF Corporation)

PREPARATION EXAMPLE 1

Preparation of Primer Composition

The following components were sufficiently mixed in amounts mentioned below to prepare the respective primer compositions P1 to P5.

| Primer composition P1 | |
| --- | --- |
| Primer base | 16.07 parts |
| Coupling agent (Fa) | 0.48 part |
| Toluene | 83.45 parts |
| Primer composition P2 | |
| Primer base | 16.07 parts |
| Organic peroxide 1 | 0.19 part |
| Coupling agent (Fa) | 0.47 part |
| Toluene | 83.27 parts |
| Primer composition P3 (for comparison) | |
| Primer base | 16.07 parts |
| Organic peroxide 1 | 0.19 part |
| Toluene | 83.74 parts |
| Primer composition P4 | |
| Primer base | 16.07 parts |
| Organic peroxide 2 | 0.19 part |
| Coupling agent (Fb) | 0.47 part |
| Toluene | 83.27 parts |
| Primer composition P5 (for comparison) | |
| Coupling agent (Fa) | 10.00 parts |
| Toluene | 90.00 parts |

PREPARATION EXAMPLE 2

Preparation of Top Coat Composition

The following components were sufficiently mixed in amounts mentioned below to prepare the respective top coat compositions T1 to T7.

| Top coat composition T1 | |
| --- | --- |
| Curable fluorine-containing resin (A1) | 34.34 parts |
| Curing agent (B1) | 11.10 parts |
| Curing catalyst | 0.17 part |
| Coupling agent (Ca) | 1.72 parts |
| Organopolysiloxane fluid | 0.17 part |
| Butyl acetate | 46.50 parts |
| Toluene | 6.00 parts |
| Top coat composition T2 | |
| Curable fluorine-containing resin (A1) | 34.34 parts |
| Curing agent (B1) | 11.10 parts |
| Curing catalyst | 0.17 part |
| Coupling agent (Ca) | 1.72 parts |
| Butyl acetate | 46.67 parts |
| Toluene | 6.00 parts |
| Top coat composition T3 (for comparison) | |
| Curable fluorine-containing resin (A1) | 34.34 parts |
| Curing agent (B1) | 11.10 parts |
| Curing catalyst | 0.17 part |
| Butyl acetate | 48.39 parts |
| Toluene | 6.00 parts |
| Top coat composition T4 (for comparison) | |
| Curable acrylic resin (A4) | 34.34 parts |
| Curing agent (B1) | 7.00 parts |
| Curing catalyst | 0.17 part |
| Coupling agent (Ca) | 1.72 parts |
| Organopolysiloxane fluid | 0.17 part |
| Butyl acetate | 50.60 parts |
| Toluene | 6.00 parts |
| Top coat composition T5 | |
| Curable fluorine-containing resin (A2) | 17.17 parts |
| Curable acrylic resin (A4) | 17.17 parts |
| Curing agent (B1) | 7.00 parts |
| Curing catalyst | 0.17 part |
| Coupling agent (Ca) | 1.72 parts |
| Organopolysiloxane fluid | 0.17 part |
| Butyl acetate | 50.60 parts |
| Toluene | 6.00 parts |
| Top coat composition T6 | |
| Curable fluorine-containing resin (A2) | 34.34 parts |
| Curing agent (B1) | 11.10 parts |
| Curing catalyst | 0.17 part |
| Coupling agent (Ca) | 1.72 parts |
| Butyl acetate | 46.67 parts |
| Toluene | 6.00 parts |
| Top coat composition T7 | |
| Curable fluorine-containing resin (A3) | 34.34 parts |
| Curing agent (B1) | 11.10 parts |
| Curing catalyst | 0.17 part |
| Coupling agent (Ca) | 1.72 parts |
| Butyl acetate | 46.67 parts |
| Toluene | 6.00 parts |

EXAMPLES 1 to 8

Each primer composition shown in Table 1 was applied by an air spray method on a substrate 1 (silicone rubber formed using silicone rubber SH851u available from Dow Corning Toray Co., Ltd., 100 mm×100 mm×2 mm) and on a substrate 2 (silicone rubber substrate produced by applying a silicone coating (SR2306 available from Dow Corning Toray Co., Ltd.) on the substrate 1,100 mm×100 mm×2 mm), so that a cured film thickness became 5 μm, followed by drying at 180° C. for five minutes and allowing to stand for cooling.

Then on the uncured primer layer was applied a top coat composition shown in Table 1 by an air spray method so that a cured film thickness became 20 μm, followed by drying at 180° C. for ten minutes and allowing to stand one day and night at room temperature for curing the primer layer and top coat layer to produce laminated articles of the present invention.

With respect to the obtained respective laminated articles, the following tests were carried out. The results are shown in Table 1.

(Adhesion Test)
A cross-cut test is carried out according to JIS K5400.
(Bending Test)
The laminated article produced using the substrate 2 is bent 180° three times with the top coat layer facing outward, and then the conditions of the coating film are observed with naked eyes.

(Stain-Proofing Test)

Various stains are coated on the top coat layer of the laminated article produced using the substrate 2, and after allowing to stand at room temperature one day and night, the stains are wiped with a paper towel. The conditions of the surface after the wiping are observed with naked eyes and evaluated by the following criteria.
1: Stain is completely wiped off and there is no marking of stain.
2: Stain can be wiped off, but there remains marking of stain slightly.
3: Stain can be wiped off, but there remains marking of stain all over the surface.
4: Stain cannot be wiped off partly.
5: Stain cannot be wiped off at all.

Stains used are as follows.
Oil ink: Artline Black available from Shachihata Inc.
Lipstick: CALIFORNIA COLORS available from NIHON KOLMAR CO., LTD.
Ball-point pen with oil ink: PR-10 available from KOKUYO CO., LTD.

TABLE 1

|  | Example | | | |
|---|---|---|---|---|
|  | 1 | 2 | 3 | 4 |
| Laminated article | | | | |
| Primer layer | P1 | P2 | P2 | P2 |
| Top coat layer | T1 | T1 | T2 | T5 |
| Properties | | | | |
| Adhesion test | | | | |
| Substrate 1 | 100/100 | 100/100 | 100/100 | 100/100 |
| Substrate 2 | 100/100 | 100/100 | 100/100 | 100/100 |
| Bending test | no peeling | no peeling | no peeling | no peeling |
| Stain-proofing test | | | | |
| Oil ink | 1 | 1 | 2 | 2 |
| Lipstick | 1 | 1 | 1 | 1 |
| Ball-point pen with oil ink | 1 | 1 | 2 | 1 |

|  | Example | | | |
|---|---|---|---|---|
|  | 5 | 6 | 7 | 8 |
| Laminated article | | | | |
| Primer layer | P4 | P4 | P2 | P2 |
| Top coat layer | T1 | T5 | T6 | T7 |
| Properties | | | | |
| Adhesion test | | | | |
| Substrate 1 | 100/100 | 100/100 | 100/100 | 100/100 |
| Substrate 2 | 100/100 | 100/100 | 100/100 | 100/100 |
| Bending test | no peeling | no peeling | no peeling | no peeling |
| Stain-proofing test | | | | |
| Oil ink | 1 | 2 | 2 | 3 |
| Lipstick | 1 | 1 | 1 | 1 |
| Ball-point pen with oil ink | 1 | 2 | 2 | 2 |

COMPARATIVE EXAMPLES 1 to 4

Laminated articles were produced in the same manner as in Example 1 except that components shown in Table 2 were used, and properties thereof were evaluated in the same manner as in Example 1. The results are shown in Table 2.

TABLE 2

|  | Comparative Example | | | |
|---|---|---|---|---|
|  | 1 | 2 | 3 | 4 |
| Laminated article | | | | |
| Primer layer | P2 | P2 | P3 | P5 |
| Top coat layer | T3 | T4 | T1 | T2 |
| Properties | | | | |
| Adhesion test | | | | |
| Substrate 1 | 80/100 | 100/100 | 0/100 | 70/100 |
| Substrate 2 | 80/100 | 100/100 | 0/100 | 80/100 |
| Bending test | partly peeled | no peeling | peeled | partly peeled |
| Stain-proofing test | | | | |
| Oil ink | 2 | 4 | 1 | 2 |
| Lipstick | 1 | 4 | 1 | 1 |
| Ball-point pen with oil ink | 2 | 4 | 1 | 2 |

INDUSTRIAL APPLICABILITY

According to the present invention, a laminated article being excellent in stain-proofing property, sliding property and interlayer adhesion can be provided. Other effects are as explained supra.

The invention claimed is:
1. A laminated article comprising a substrate (III), a primer layer (II) provided on the substrate (III) and a top coat layer (I) provided directly on the primer layer (II), in which
the top coat layer (I) is formed with a cured article of a top coat composition comprising (A) a curable fluorine-containing resin, (B) a curing agent and (C) a coupling agent comprising a functional group-containing silane coupling agent and/or an aluminum chelating agent, and
the primer layer (II) is formed with a primer composition comprising (D) a polydiorganosiloxane, (E) a polyorganosiloxane resin and (F) a coupling agent comprising a functional group-containing silane coupling agent and/or an aluminum chelating agent,
wherein (B) the curing agent is at least one curing agent selected from the group consisting of an isocyanate curing agent and an amino curing agent,
the isocyanate curing agent being at least one selected from the group consisting of 2,4-tolylene diisocyanate, diphenylmethane-4,4'-diisocyanate, xylylene diisocyanate, isophorone diisocyanate, lysine methyl ester diisocyanate, methylcyclohexyl diisocyanate, trimethylhexamethylene diisocyanate, hexamethylene diisocyanate, n-pentane-1,4-diisocyanate, trimers thereof, adducts and biurets thereof, polymers thereof having at least two isocyanate groups, and blocked isocyanates;
the amino curing agent being at least one selected from the group consisting of a melamine resin, urea resin, guanamine resin, amine adduct, and polyamide;
wherein (D) the polydiorganosiloxane comprises repeating siloxane units of the formula $R_2SiO_{2/2}$, in which R is a substituted or unsubstituted monovalent hydrocarbon group,
wherein (E) the polyorganosiloxane resin comprises siloxane units of the formula $R_3SiO_{1/2}$, in which R is a substituted or unsubstituted monovalent hydrocarbon group, and siloxane units of the formula $SiO_{4/2}$,
wherein a molar ratio of the $R_3SiO_{1/2}$ siloxane units to the $SiO_{4/2}$ siloxane units in (E) the polyorganosiloxane resin is within a range of 0.5 to 1.5, and
wherein the substrate (III) is a silicone rubber substrate.

2. The laminated article of claim 1, wherein said curable fluorine-containing resin (A) has hydroxyl as a curable group.

3. The laminated article of claim 2, wherein said top coat layer (I) contains an isocyanate group-containing silane coupling agent as the coupling agent (C).

4. The laminated article of claim 3, wherein said primer layer (II) contains an aluminum chelating agent and/or an amino-containing silane coupling agent as the coupling agent (F).

5. The laminated article of claim 2, wherein said top coat layer (I) contains an aluminum chelating agent as the coupling agent (C).

6. The laminated article of claim 5, wherein said primer layer (II) contains an aluminum chelating agent and/or an amino-containing silane coupling agent as the coupling agent (F).

7. The laminated article of claim 1, wherein said top coat layer (I) further contains polytetrafluoroethylene particles.

8. The laminated article of claim 1, wherein in the primer composition for the primer layer (II), the polydiorganosiloxane (D) comprises recurring units of $R_2SiO_{2/2}$ siloxane unit and has a viscosity of not less than 100 mPa·s at 25° C., and the polyorganosiloxane resin (E) comprises $R_3SiO_{1/2}$ siloxane unit and $SiO_{4/2}$ siloxane unit.

9. A keypad for mobile phone made up by using the laminated article of claim 1.

10. A method of producing a laminated article, the laminated article comprising a substrate (III), a primer layer (II) provided on the substrate (III) and a top coat layer (I) provided directly on the primer layer (II), in which the top coat layer (I) is formed with a cured article of a top coat composition comprising (A) a curable fluorine-containing resin, (B) a curing agent and (C) a coupling agent comprising a functional group-containing silane coupling agent and/or an aluminum chelating agent, and the primer layer (II) is formed with a primer composition comprising (D) a polydiorganosiloxane, (E) a polyorganosiloxane resin and (F) a coupling agent comprising a functional group-containing silane coupling agent and/or an aluminum chelating agent, wherein (B) the curing agent is at least one curing agent selected from the group consisting of an isocyanate curing agent and an amino curing agent, the isocyanate curing agent being at least one selected from the group consisting of 2,4-tolylene diisocyanate, diphenylmethane-4,4'-diisocyanate, xylylene diisocyanate, isophorone diisocyanate, lysine methyl ester diisocyanate, methylcyclohexyl diisocyanate, trimethylhexamethylene diisocyanate, hexamethylene diisocyanate, n-pentane-1,4-diisocyanate, trimers thereof, adducts and biurets thereof, polymers thereof having at least two isocyanate groups, and blocked isocyanates;

the amino curing agent being at least one selected from the group consisting of a melamine resin, urea resin, guanamine resin, amine adduct, and polyamide, wherein (D) the polydiorganosiloxane comprises repeating siloxane units of the formula $R_2SiO_{2/2}$, in which R is a substituted or unsubstituted monovalent hydrocarbon group, wherein (E) the polyorganosiloxane resin comprises siloxane units of the formula $R_3SiO_{1/2}$, in which R is a substituted or unsubstituted monovalent hydrocarbon group, and siloxane units of the formula $SiO_{4/2}$, wherein a molar ratio of the $R_3SiO_{1/2}$ siloxane units to the $SiO_{4/2}$ siloxane units in (E) the polyorganosiloxane resin is within a range of 0.5 to 1.5, and wherein the substrate (III) is a silicone rubber substrate, which method comprises:

a step for forming a coating film of a primer composition comprising (D) the polydiorganosiloxane, (E) the polyorganosiloxane resin and (F) the coupling agent comprising a functional group-containing silane coupling agent and/or an aluminum chelating agent on the substrate (III) directly or through an intervenient layer, a step for forming an uncured top coat layer by applying a top coat composition comprising (A) the curable fluorine-containing resin, (B) the curing agent and (C) the coupling agent comprising a functional group-containing silane coupling agent and/or an aluminum chelating agent, and a step for curing the uncured top coat layer.

11. The method of producing a laminated article of claim 10, the laminated article comprising a substrate (III), a primer layer (II) provided on the substrate (III) and a top coat layer (I) provided directly on the primer layer (II), which method comprises:

a step for forming a coating film of a primer composition comprising (D) the polydiorganosiloxane, (E) the polyorganosiloxane resin and (F) the coupling agent comprising a functional group-containing silane coupling agent and/or an aluminum chelating agent on the substrate (III) directly or through an intervenient layer, a step for subjecting the coating film to drying or crosslinking reaction, a step for forming an uncured top coat layer by applying a top coat composition comprising (A) the curable fluorine-containing resin, (B) the curing agent and (C) the coupling agent comprising a functional group-containing silane coupling agent and/or an aluminum chelating agent, and a step for curing the uncured top coat layer.

\* \* \* \* \*